United States Patent [19]
Hoffman

[11] Patent Number: 5,342,139
[45] Date of Patent: Aug. 30, 1994

[54] SNAP MOUNTED ATTACHMENT DEVICE

[75] Inventor: Keith E. Hoffman, Atlanta, Ind.

[73] Assignee: Bridgestone/Firestone, Inc., Akron, Ohio

[21] Appl. No.: 953,913

[22] Filed: Sep. 30, 1992

[51] Int. Cl.$^5$ .............................................. B25G 3/00
[52] U.S. Cl. ............................... 403/405.1; 403/406.1; 403/24; 267/219; 267/64.23
[58] Field of Search .................. 403/405.1, 406.1, 235, 403/238, 195, 197, 24; 267/219, 35, 64.19, 64.23

[56] References Cited

U.S. PATENT DOCUMENTS

| | | | |
|---|---|---|---|
| 1,951,013 | 3/1934 | Flintermann | 403/407.1 |
| 2,545,514 | 3/1951 | Erb | 403/197 |
| 3,169,292 | 2/1965 | Fenton | 24/213 |
| 3,415,155 | 12/1968 | Riddell et al. | 85/80 |
| 3,476,008 | 11/1969 | Pearson et al. | 85/5 |
| 3,628,816 | 12/1971 | Ross, Jr. | 403/405.1 |
| 3,682,464 | 8/1972 | Krejcir | 267/65 |
| 3,818,729 | 6/1974 | Kenreich et al. | 68/23.7 |
| 4,012,155 | 3/1977 | Morris | 403/290 |
| 4,506,910 | 3/1985 | Bierens | 280/711 |
| 4,564,177 | 1/1986 | Leonard | 267/64.24 |
| 4,588,218 | 5/1986 | Guiler | 403/405.1 |
| 4,675,937 | 6/1987 | Mitomi | 403/238 |
| 4,718,650 | 1/1988 | Geno | 267/64.27 |
| 4,739,543 | 4/1988 | Harris, Jr. | 24/297 |
| 4,798,369 | 1/1989 | Geno et al. | 267/64.11 |
| 4,804,303 | 2/1989 | Statkus | 411/41 |
| 4,852,861 | 8/1989 | Harris | 267/64.27 |
| 4,899,995 | 2/1990 | Hoffman et al. | 267/64.27 |
| 5,005,265 | 4/1991 | Muller | 24/453 |
| 5,039,124 | 8/1991 | Widmer | 280/711 |

*Primary Examiner*—P. Austin Bradley
*Assistant Examiner*—Rex E. Pelto
*Attorney, Agent, or Firm*—David A. Thomas

[57] ABSTRACT

A one-piece attachment device for mounting an end of a fluid actuated member on a support component. The attachment device has a plurality of first flexible fingers which terminate at a tip provided with an outwardly extending shoulder and a tapered camming surface. The fingers are moved inwardly by engagement of the camming surfaces with the support component as the fingers pass through an aperture formed therein, and thereafter attempt to return toward their original position. The finger shoulders engage the support component to secure the attachment device to the support component. A second plurality of inwardly and upwardly extending flexible fingers are also provided on the attachment device and define an interior opening. A mounting stud of a fluid actuated member is inserted through the interior opening and the second fingers will move outwardly initially upon passage of the stud therethrough, afterwhich the finger attempt to return toward their original position securely gripping and retaining the stud therebetween to secure the fluid actuated member to the attachment device. In another embodiment the second fingers have inwardly extending tangs, the tips of which form the interior opening for securing and gripping the mounting stud therein.

16 Claims, 5 Drawing Sheets

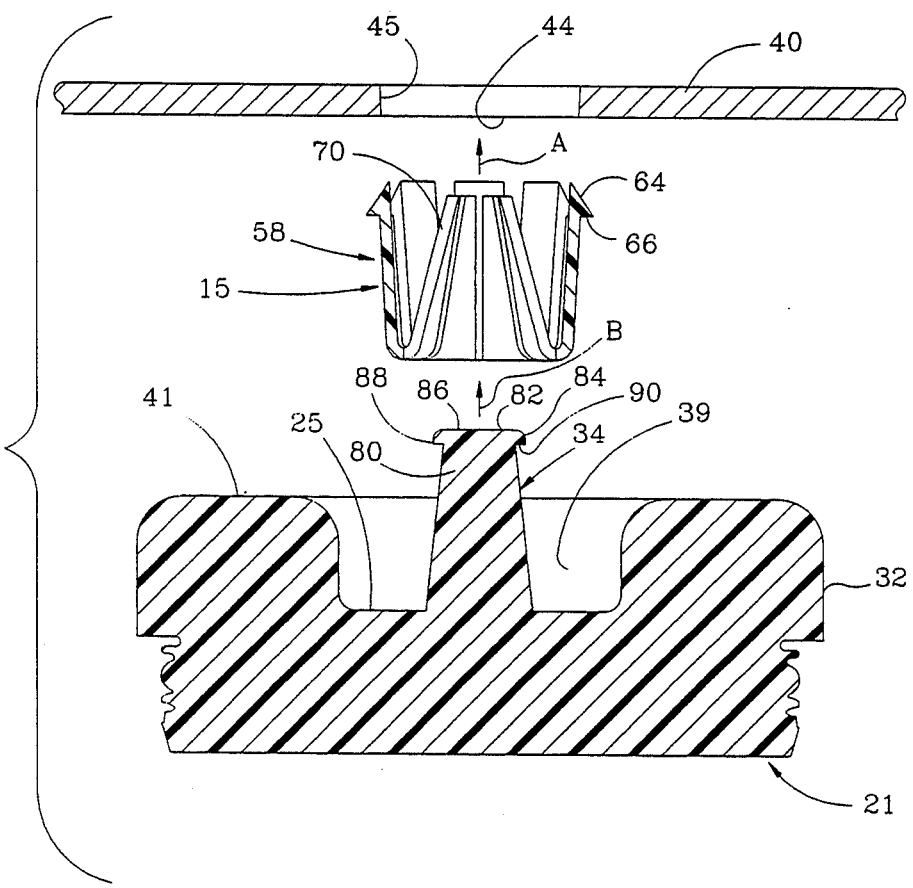
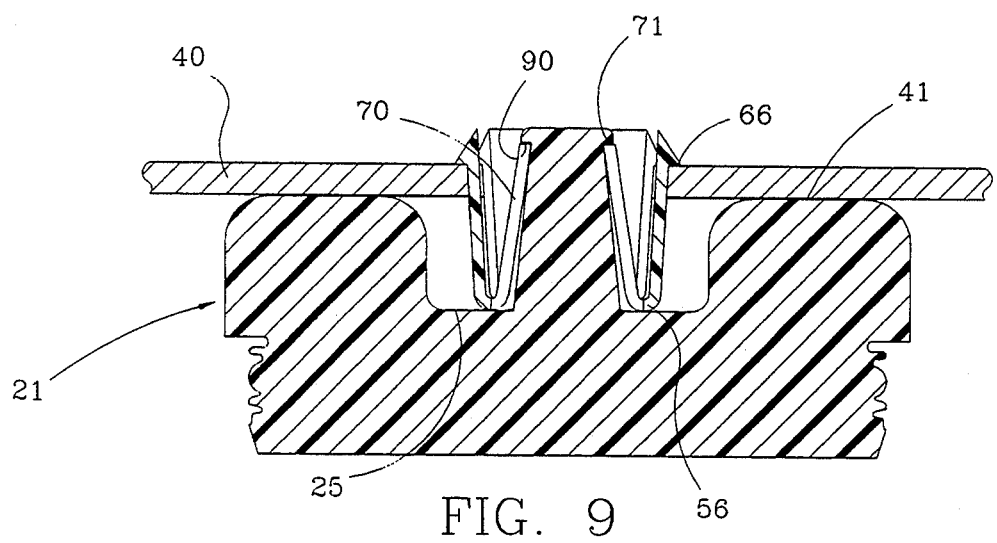

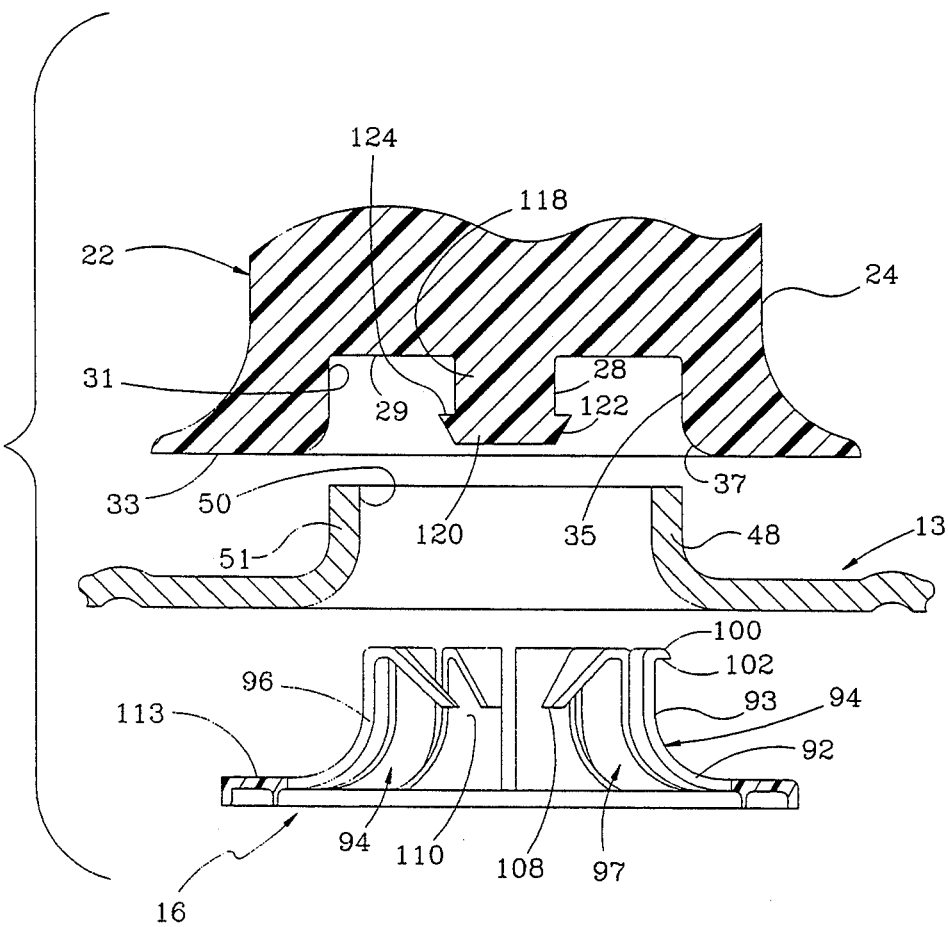
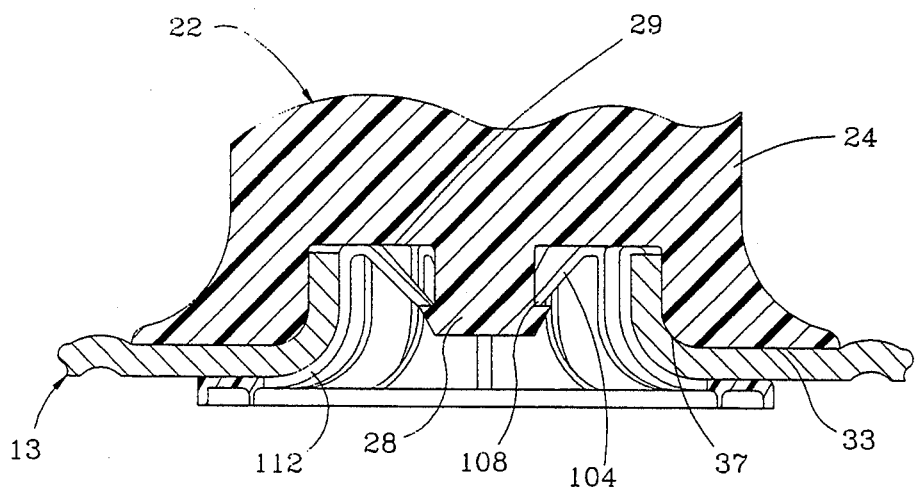

SNAP MOUNTED ATTACHMENT DEVICE

BACKGROUND OF THE INVENTION

1. Technical Field

The present invention relates generally to attachment devices. More particularly, the present invention relates to snap-fit attachment devices for use to retain a flexible member between two spaced support components without additional attachment fasteners. Specifically, the present invention is directed to a snap mounted attachment means intended primarily for mounting the ends of a fluid actuated device between two spaced support components.

2. Background Information

Fluid actuated devices take many forms of which air springs are one type. Air springs consisting of a pair of spaced end members and an intervening flexible sleeve or bellows which forms an internal pressurized fluid chamber, have been used for many applications, such as mounting between spaced components of a vehicle for absorbing road shock, supporting parts of machines and equipment, such as presses on which shock forces are continually imparted, and for regulating and maintaining the spacing between two spaced components of various pieces of equipment. These air springs assume various configurations depending upon their particular application. Such air springs usually consist of one end member which is an end cap, with the other member being a piston. The piston usually has a conical outer surface over which a rolling lobe of the flexible bellows moves for affecting the damping of the vehicle or equipment on which the air spring is mounted.

Some examples of such prior art air springs are shown in U.S. Pat. Nos. 3,682,464, 4,506,910 and 4,718,560.

Heretofore, these air springs were attached to the spaced supporting members, and in particular to the spaced components of a vehicle, by various attachment bolts or fasteners which extend into the piston and end cap, such as shown in the above referenced patents. However, for certain applications, due to the limited space available for mounting the air springs within a vehicle and the inaccessibility of the air spring mounting supports or brackets, difficulties are encountered in reaching both ends of the air spring for securing the same to the support members by usual attachment bolts. Also, the use of separate attachment bolts, even if access is possible, requires additional equipment and manpower for securing the bolts to the air springs. Moreover, the oxidation of the metal fasteners create potential failure problems for the air spring assembly. Also employed in the prior art, is the blind hole bolt attachment, as explained in more detail in the specification to follow.

Therefore, the need exists for an improved attachment device for mounting a first member such as an end cap of an air spring, onto a supporting structure, and in particular for mounting the end cap and piston of an air spring onto spaced supports within a vehicle without separate attachment bolts or fasteners. Various types of snap mounting attachment devices have been developed in the past for various applications, examples of which are shown in the following patents.

U.S. Pat. No. 3,169,292 discloses a snap fastener which includes a stud element having beveled surfaces which join a neck and a large diameter surface. The beveled surface will facilitate the removal of the stud from the socket opening. A bulbous head has a curved cam surface which facilitates attachment of the fastener to the socket.

U.S. Pat. No. 3,415,155 discloses a bushing formed of plastic having resilient ears which project radially outwardly from a main body of the bushing adjacent one end and has a radial annular shoulder on the bushing adjacent the other end which is snap-fitted through a hole in a plate when inserted through the hole, with the ears remaining on the exterior of the plate, after which a pin is snap-fitted into the bushing.

U.S. Pat. No. 3,476,008 discloses a fastener having a shoulder portion which facilitates secure attachment of the fastener. The stud fastener has a disc shaped head and legs which have shoulders which extend through a support aperture to engage edges of the aperture and attach the fastener to the support.

U.S. Pat. No. 3,818,729 discloses a brake yoke rod attachment for an automatic washer which has a plurality of segments which have frustaconical surfaces which are formed as angled cam surfaces to facilitate installation and removal of the attachment on the washer.

U.S. Pat. No. 4,012,155 discloses a snap lock connector in which a male member of the connector has leading and camming surfaces which correspond to leading and camming surfaces of a female member. These camming surfaces facilitate the installation and withdrawal of the male member within the female member. The connector is used principally to facilitate storage and shipping.

U.S. Pat. No. 4,564,177 is directed to an attachment clamp which not only attaches the non-beaded bellows to the piston plate, but also attaches the piston plate to the support structure through a threadable engagement between the clamp and the support structure itself. The bellows herein is attached to the piston by interposing the bellows between the clamp and the piston in a clamping arrangement.

U.S. Pat. No. 4,804,303 discloses an attachment block assembly that is connected to a support structure by use of resilient leg elements. A base component is forcibly removed from the frame plate by flexing the resilient legs inwardly so that a latch member will be allowed to glide over the edge of an opening. Snap fastener legs each have a cam surface to facilitate removal and insertion of the fastener from a plate.

U.S. Pat. No. 4,739,543 discloses a push pin fastener for securing automotive trim to an automobile body. The fastener includes arms or legs having locking surfaces which facilitate insertion of the pin and prevent removal once inserted.

U.S. Pat. No. 4,798,369 discloses an ultrasonic air spring system adapted to be mounted on a vehicle for observing road shock exerted on the vehicle and for maintaining the vehicle body level with respect to the axles.

U.S. Pat. No. 5,005,265 discloses a two-piece stud assembly in which the stud has a plurality of angled flexible camming members engaged within a counterbore receiving aperture of a second member for securing the stud within the bushing for attaching two members together.

U.S. Pat. No. 5,039,124 discloses a frame and suspension assembly which includes an air spring attached between two spaced apart members one being the vehicle frame, the other being the walking member, with the air spring interposed therebetween being connected to each member via a bolt traveling through a mounting plate attached to each member and threadably engaging the piston and end cap of the air spring unit.

Although many of the prior art snap mounting attachment devices perform satisfactorily for the purpose intended, they would not be suitable for mounting air springs between two spaced apart members since they do not provide the necessary rigidity, as well as the necessary strength to resist both axial forces as well as shear forces upon the unit. This lack of strength is evidenced by the fact that the industry does not employ the prior art snap-fit clamps to retain the air springs, but instead provides for studs protruding from both the end cap as well as from the piston to threadably engage, or frictionally engage the spaced apart members. Such studs provide logistical problems in that often the spring is positioned in such a manner that tools cannot be used to tighten nuts onto the studs, and occasionally even the studs themselves prevent the mechanic from easily positioning the air spring between the spaced apart members due to the overall length of the air spring. Moreover, the metal studs are subject to corrosion, and the air spring itself must often be replaced when the studs are broken.

Therefore, the need exists for an improved attachment device which permits the assembly of an air spring between spaced apart members, in areas where accessibility to the mounting surfaces is limited, and in which the attachment device is able to withstand radial shear forces as well as axial forces without loosening or disengagement of the two attached members, and which provides for a durable, long lasting attachment device unknown heretofore in the art.

SUMMARY OF THE INVENTION

Objectives of the invention include providing an improved snap mounted attachment device which is molded of a high strength plastic material and which is adapted to be inserted through a circular hole formed through each of the spaced apart support components on either side of an air spring, for mounting the air spring onto the spaced apart support components when access to the mounting surfaces is limited.

Another objective is to provide such an attachment device in which the device may be inserted, and subsequently the air spring installed between the spaced apart support components, without the use of tools other than hand force of the mechanic.

A still further objective of the invention is to provide such an attachment device which provides the necessary rigidity to retain the air spring between the spaced apart support components when such spaced apart members are subject to both radial shear stress, as well as axial stress.

Yet another objective of the invention is to provide such an attachment device which allows the use of current suspension components designed for conventional coil spring installation.

It is still another objective of the present invention to provide a positive interlock, snap-fit connection between the coil spring, the attachment device, and the support components.

It is a further objective to provide such an attachment device for retaining an air spring between spaced apart support components wherein an end cap attachment clip is provided to positively connect the end cap of the air spring to an upper support component, and a piston attachment clip to attach the air spring piston to a lower support component through a positive snap-fit connection between the piston attachment clip, the support component and the air spring piston.

Another objective is to provide such an air spring attachment device which may be easily molded of a high strength plastic material and which achieves the stated objectives in a simple, effective, and inexpensive manner, and which solves problems and satisfies needs in the art.

A further objective is to provide an improved method for mounting a fluid actuated member between a pair of spaced apart components by the snap-fit mounting of a pair of attachment devices into the components followed by the snap-fit mounting of the fluid actuated member into the previously mounted attachment devices.

These and other objectives and advantages are obtained by the attachment device of the present invention which is used for mounting a fluid actuated member between two spaced apart support components, the general nature of said device may be stated as including a plurality of circumferentially spaced upstanding flexible fingers, each having a free outer end with a camming surface and a retaining surface provided thereon, said retaining surfaces lying in a first imaginary circle; a plurality of circumferentially spaced upstanding second fingers each having a flexible free outer end, with said free outer ends lying in and defining a second imaginary circle concentric with and located within the first imaginary circle and forming a circular opening therebetween; said plurality of first fingers being adapted to flex inwardly and pass through an aperture of a support component when inserted therethrough, with said retaining surfaces being adapted to engage a support component to secure said attachment device on a support component; and said free outer ends of the second plurality of fingers being adapted to engage a mounting component of a fluid actuated member when such a component is inserted through the opening defined by said second fingers, to secure a fluid actuated member on a support component, after said attachment device has been mounted thereon.

These objectives and advantages of the invention are further obtained by the method of the present invention, the general nature of which may be stated as including a method of attaching a fluid actuated member on spaced apart first and second support components, each of said components having an aperture formed therein, said method including the steps of inserting a first attachment device through the aperture of the first support component to provide a snap-fit mounting engagement between said first attachment device and said first support component; inserting a mounting stud of a first end member of said fluid actuated member through a portion of said first attachment device to provide a snap-fit engagement between the mounting stud of said first end member and the first attachment device; inserting a second attachment device into the aperture of the second support component to provide a snap-fit mounting engagement between said second support component and the second attachment device; and inserting a mounting stud of a second end member of said fluid actuated member through a portion of said second attachment device to provide a snap-fit engagement between the mounting stud of the second end member and the attachment device securely mounting said fluid actuated member on and between the spaced support components.

BRIEF DESCRIPTION OF THE DRAWINGS

Preferred embodiments of the invention, illustrative of the best modes in which the applicant has contemplated applying the principles, as set forth in the following description and are shown in the drawings and are particularly and distinctly pointed out and set forth in the appended claims.

FIG. 8 is an exploded sectional view, showing the end cap of an air spring prior to being secured to a structural member by the end cap attachment device;

FIG. 9 is a sectional view showing the securing of the end cap of the air spring of FIG. 8 to the structural member by the end cap attachment device;

FIG. 10 is an exploded sectional view, showing a portion of a piston of an air spring prior to being secured to a structural mounting member by the piston attachment device;

FIG. 11 is a sectional view, showing the securing of the piston of FIG. 10 to the structural member by the piston attachment device.

Similar numerals refer to similar parts throughout the drawings.

DESCRIPTION OF THE PREFERRED EMBODIMENTS

Figure 1:
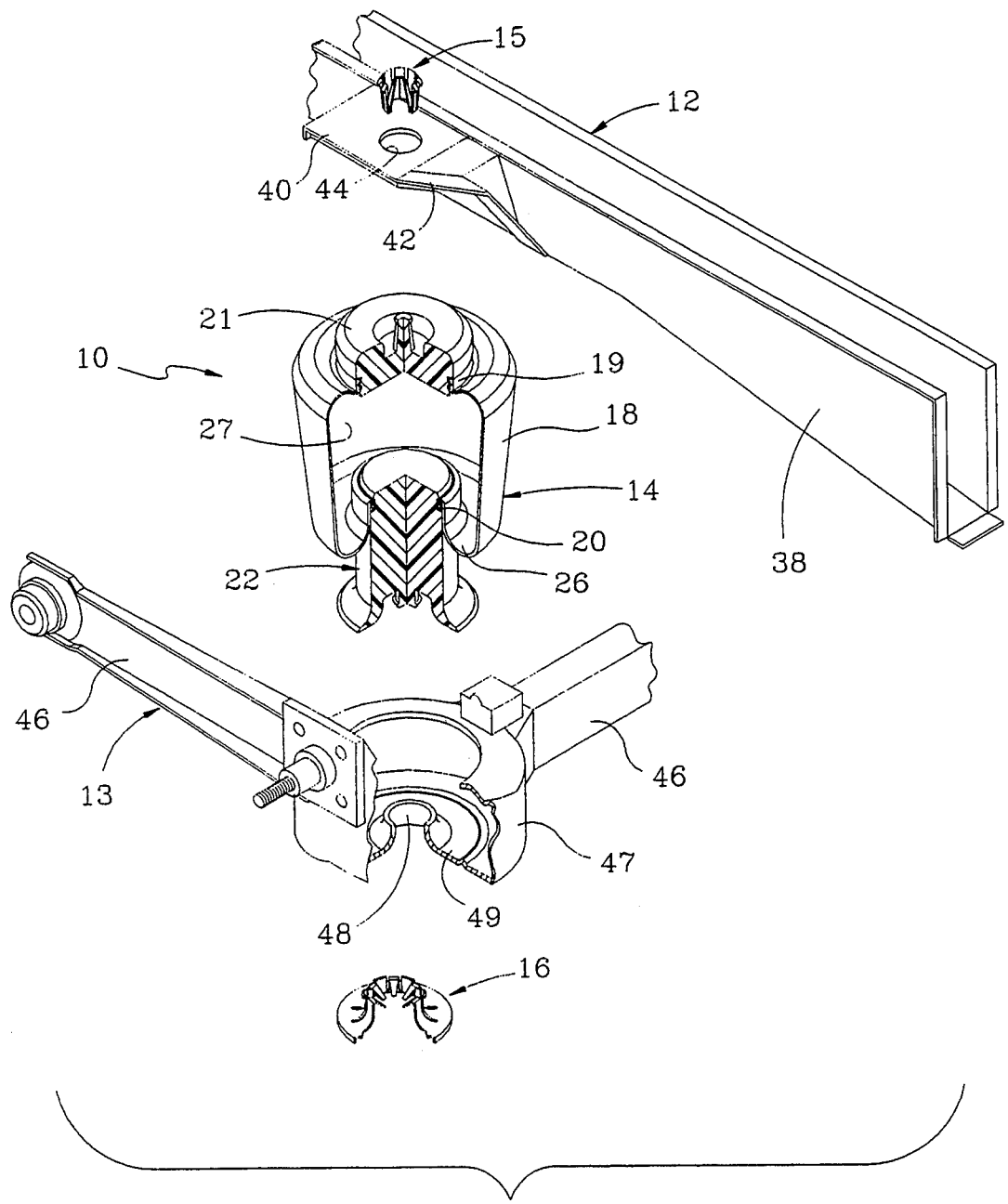
FIG. 1 is a fragmentary exploded perspective view, with portions broken away and in section, showing the air spring and two embodiments of the attachment device of the present invention prior to mounting on two spaced structural components of a vehicle.

A portion of a suspension assembly indicated generally at 10, is shown in FIG. 1, and includes an upper structural component 12 such as the frame rail of a vehicle, and a lower structural component 13, such as the walking rail of the vehicle suspension assembly. Components 12 and 13 are spaced apart to accept a fluid actuated member or air spring 14 therebetween. Fluid actuated member 14 is secured to upper structural component 12 by an end cap attachment device 15 and to lower structural support 13 by a piston attachment device 16. Fluid actuated member 14 is described throughout as an air spring, but it is understood that the attachment devices of the present invention can be used to retain other types of fluid actuated members between two spaced apart support components.

Air spring 14 is of a usual construction consisting of an open ended flexible sleeve or bellows 18, which is sealingly secured by clamp rings 19 and 20 to an end cap 21 and to a piston 22, respectively. Such a construction is shown generally in U.S. Pat. No. 4,852,861, the contents of which are incorporated herein by reference.

Referring to FIGS. 1, 10 and 11, piston 22 has a conical outer surface 24 along which a rolling lobe 26 of bellows 18 will move when the air spring moves between expanded and compressed positions to achieve a desired damping by compressing a fluid, such as air, contained within a fluid chamber 27 of bellows 18. A mounting stud 28 extends outwardly from a bottom surface 29 of a central recess 31 formed in the center of piston bottom surface or base 33. Recess 31 has a generally cylindrical sidewall 35 and merges with base 33 by a rounded annular corner 37.

Referring to FIGS. 1, 8 and 9, end cap 21 of air spring 14 includes a generally cylindrical outer wall 32, and may be provided with a fluid inlet coupling (not shown) for supplying pressurized fluid into chamber 27. An end cap mounting stud 34 extends outwardly from a bottom surface 25 of a recess 39 formed in a top surface 41 of end cap 21. Outer surface 36 of end cap 21 terminates in a grooved sealing surface 43, such as shown in U.S. Pat. No. 4,899,995, the contents of which are incorporated herein.

End cap 21 and piston 22 preferably are both one-piece members formed of a high strength plastic material, although they may be formed of aluminum or other lightweight material if desired.

Upper structural component 12 may have a rail portion 38 with a mounting bracket 40 and a support leaf 42 extending outwardly therefrom. An aperture 44 is formed in bracket 40 into which end cap attachment device 15 is inserted for receiving mounting stud 34 of end cap 21 therein, for mounting end cap 21 on component 12. Aperture 44 is defined by an inner cylindrical surface 45 (FIG. 8). Lower structural component 13 may include a pair of rails 46 joined by an annular housing 47 having an annular boss 48 extending upwardly from a bottom wall 49 thereof and forming a circular aperture 50.

Figure 3:
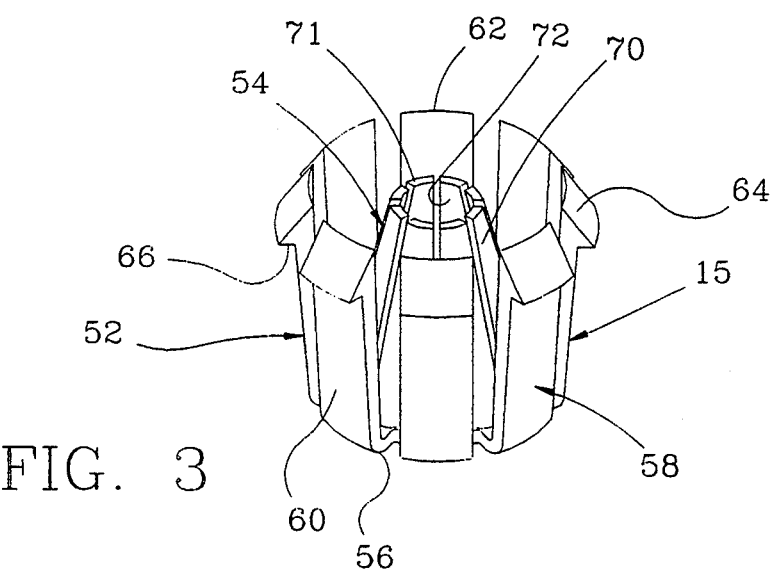
FIG. 3 is a perspective view of the end cap attachment device.
Figure 2:
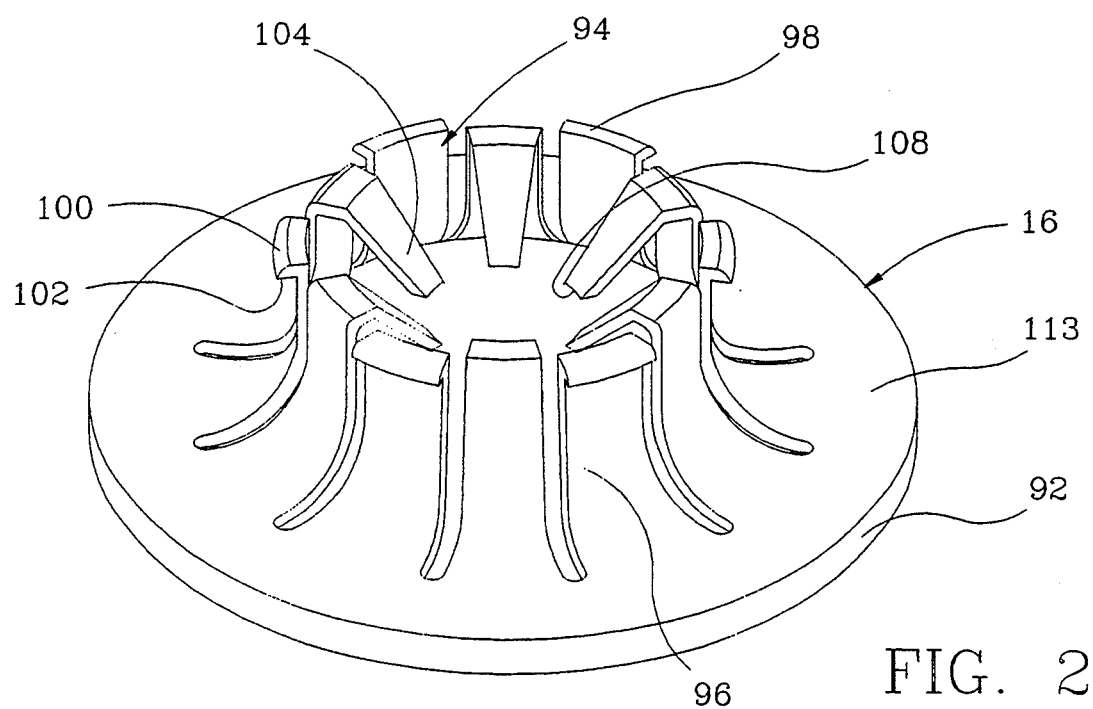
FIG. 2 is a perspective view of the piston attachment device.
Figure 5:
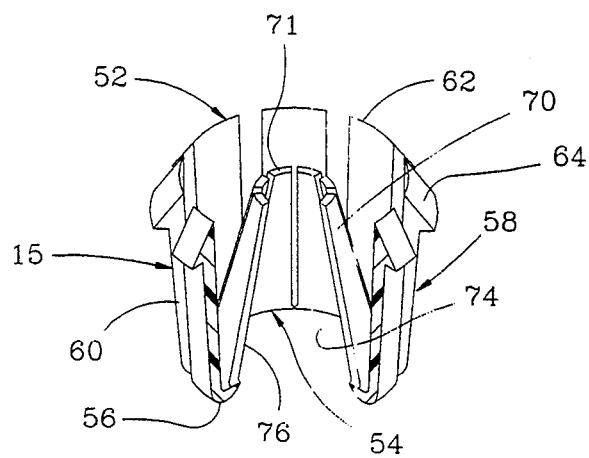
FIG. 5 is a perspective view, with portions broken away and in section, of the end cap attachment device of FIG. 3.
Figure 7:
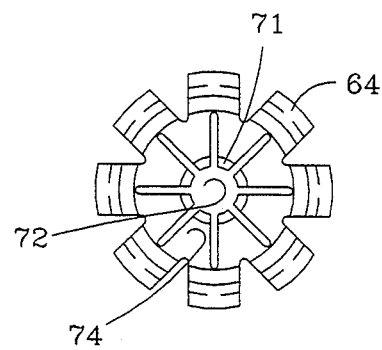
FIG. 7 is a top plan view of FIG. 3.
Figure 6:
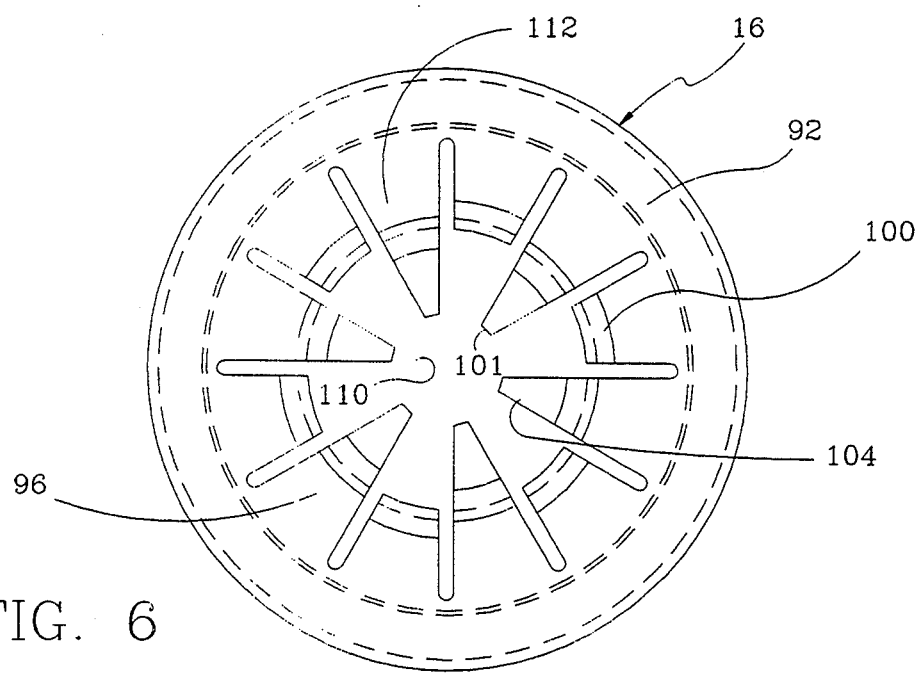
FIG. 6 is a top plan view of FIG. 2.
Figure 4:
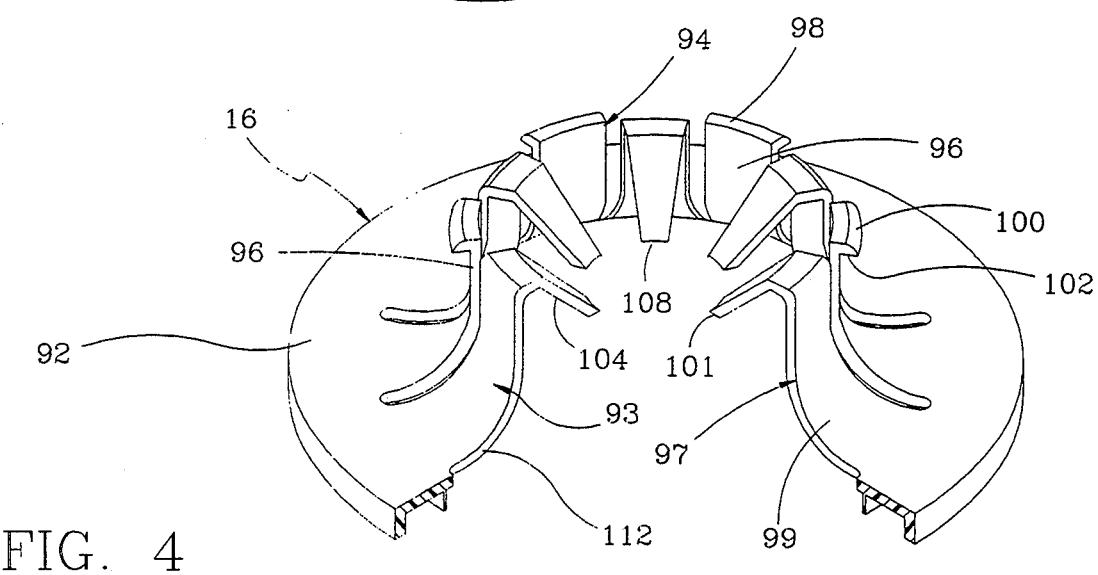
FIG. 4 is a perspective view, with portions broken away and in section, of the piston attachment device of FIG. 2.

Referring then to FIGS. 3, 5 and 7, end cap attachment device 15 includes generally a pair of spaced slotted walls 52 and 54, integrally joined at an annular base 56, whereby walls 52 and 54 provide a single one-piece part preferably molded of a plastic material. Outer wall 52 is substantially cylindrical and is formed by a plurality of equally spaced flexible fingers 58. Each finger 58 has a stem 60 which terminates at a tip 62. Tip 62 has a downwardly outwardly extending camming surface 64 which joins with stem 60 by a radially outwardly extending shoulder 66. The opposite ends of stems 60 connect with base 56 by included fillets which provide stress relief areas to prevent breakage of the fingers when they are flexed inwardly when installed in aperture 44 of mounting bracket 40.

Inner wall 54 is formed by a second plurality of equally spaced flexible fingers 70, extending upwardly and inwardly from base 56 to form wall 54 in a frustaconical shape. The free ends 71 of fingers 70 lie in a imaginary circle and form a circular opening 72 therebetween, best shown in FIG. 7. Opening 72 is the smallest diameter of a frustaconical inner cavity 74 defined by the inner surfaces 76 of fingers 70. Inasmuch as inner surfaces 76 extends inwardly toward opening 72 they act as a camming surface when mounting stud 34 of end cap 21 is inserted into cavity 74.

As best seen in FIG. 8, mounting stud 34 has a frustaconical stem 80 with a bulbous head 82 extending from the top thereof. Bulbous head 82 has a flange 84 that extends circumferentially around and radially outwardly from stem 80. Flange 84 has an upper surface 86 which is rounded over at 88, and a lower shoulder surface 90. Stem 80 preferably is shaped to be substantially complementary to inner cavity 74. Moreover, inner cavity 74 is sized to be slightly smaller than stem 80 such that fingers 70 remain in flexure when stem 80 is inserted into cavity 74.

Referring to FIGS. 8, and 9, end cap attachment device 15 is inserted upwardly through aperture 44 of mounting bracket 40, arrow A, allowing finger camming surfaces 64 to contact cylindrical wall 45 of aperture 44 and flex inwardly until shoulders 66 pass beyond the top edge of aperture 44 whereupon stressed fingers 58 will snap outwardly to assume the mounted or attached position as shown in FIG. 9. In this position base 56 abuts bottom surface 25 of recess 39, and shoulders 66 engage mounting plate 40 surrounding aperture 44. It is understood that end cap attachment device 15 preferably is inserted into aperture 44 from underneath the aperture, as access above aperture 44 is usually limited or unavailable in many applications, such as when mounting air spring 14 on a vehicle. However, it should be apparent that attachment device 15 could be inserted into aperture 44 from above, if access thereto was possible, without departing from the spirit of the present invention.

Once attachment device 15 is inserted through aperture 44, mounting stud 80 of end cap 21 is inserted into cavity 74 of device 15 (arrow B). Upon insertion into cavity 74, rounded surface 88 of flange 84 will contact inner surfaces 76 of fingers 70, which act as camming surfaces. Fingers 70 will flex outwardly from the pressure exerted through rounded surface 88 until shoulder 90 passes beyond top free ends 71 of fingers 70, whereupon the stressed fingers will snap inwardly to assume the position shown in FIG. 9, wherein radial shoulder 90 will engage the top free ends 71 of fingers 70, to firmly mount end cap 21 on device 15 and correspondingly on bracket 40.

The vertical length of inner fingers 70 is equal to the distance from shoulder 90 to recess surface 25 so that free ends 71 of fingers 70 will abut shoulder 90 and the base 56 of device 15, abuts annular surface 25. Moreover, the length of fingers 58 is such that when base 56 abuts surface 25, shoulders 66 will properly engage mounting bracket 40. Moreover, the lengths of fingers 58 and 70 are such so that when assembled, end cap surface 41 abuts the underside of mounting bracket 40.

The various relationship discussed above, as seen in FIG. 9, restrain the end cap from axial movement once installed on bracket 40. Particularly, when an upward force is applied to end cap 21, the abutting relation of surface 41 and the underside of mounting bracket 40, will preclude upward movement. When a downward force is applied to the end cap 21, shoulder 90 will engage free ends 71 of fingers 70. This downward force will be transferred to the snap-fit engagement between shoulder 66 and mounting bracket 40, thereby precluding the disengagement of the air spring. It is further noted that due to the angle of fingers 70, the more force applied by shoulder 90 onto free end 71 of fingers 70, the stronger the engagement between shoulder 90 and fingers 70 will become as the force will cause fingers 70 to further flex inward and restrain the movement of mounting stud 34. In order to prevent chatter, or the free movement of end cap 21 when the air spring is in dynamic load, the axial distance between shoulders 66 and end cap mounting surface 41 should be equal to the thickness of mounting bracket 40 so that the engagement therewith will be rigid, with no axial play therebetween as is shown in FIG. 9.

Referring particularly to FIGS. 2, 4, 6 and 10, piston attachment device 16 is a one-piece member, preferably molded of plastic. Device 16 includes a plurality of equally spaced deflectable flexible fingers 94 which extend generally perpendicularly upwardly from a base 92, defining a substantially cylindrical slotted wall 93. Each finger 94 includes a stem 96 which terminates at a tip 98 and has a camming surface 100 which joins stem 96 by a radially extending shoulder 102.

A second plurality of fingers 97 are located alternately between adjacent pairs of fingers 94, and are formed integrally with base 92 and extend upwardly therefrom and form slotted cylindrical wall 93 with fingers 94. Fingers 97 have tangs 104 extending downwardly and inwardly from stems 99 toward the center of device 16. The free ends 101 of tangs 104 lie in a horizontal plane and define an opening 110 which lies on an imaginary circle which is also centrally located about a central axis of device 16 and lies in a plane transverse to said axis. It is understood that in the preferred embodiment, tangs 104 are formed on the plurality of alternate second fingers 97. However, fingers 94 could have the tangs formed thereon.

The connected ends of finger stems 96 and 99 are formed integrally with disc base 92 by arcuate portions 112 which provides the necessary flexure of the fingers to deflect inwardly during assembly with lower structural component 13, and guard against failure during installation. Arcuate portions 112 terminate in a horizontal plane formed by upper surface 113 of base 92. Horizontal surface 113 of disc-shaped base 92, arcuate portions 112, and slotted cylindrical surface 93 define a smooth continuous surface.

In accordance with one of the features of the present invention, arcuate finger portions 112 are generally complementary to curved surface 37 of piston 22, and cylindrical surface 93 which is defined by the outer surfaces of fingers 94 and 97, is substantially equal in diameter to the inner diameter of aperture 50 as best seen in FIGS. 10 and 11. In this manner, the outer surface of piston attachment 16 is complementary to the mounting surface of structural component 13.

As best seen in FIG. 10, mounting stud 28 has a cylindrical boss 118 which terminates at end 120. End 120 has an upwardly and outwardly radially extending cam surface 122 which joins with cylindrical boss 118 by a radially extending shoulder 124. According to the invention, the length of the boss 118 from shoulder 124 to the recess surface 29 of piston 22 equals the axial distance from the circular opening 110 created by free ends 108 of tangs 104 to the tips 98 of fingers 94. Moreover, the diameter of cylindrical boss 118 is substantially equal to the diameter of circular opening 110.

The assembly of piston attachment device 16 is best shown in FIGS. 10 and 11. Piston attachment device 16 is inserted through aperture 50 of boss 48 of lower structural component 13. Finger camming surfaces 100 will contact the inner surface of cylindrical wall 51 of boss 48 and flex fingers 94 inwardly until shoulders 102 passes beyond the top edge of aperture 50 whereupon stressed fingers 94 will snap outwardly to assume the position as shown in FIG. 11. In this position, radial shoulders 102 will engage lower support component 13 which surrounds aperture 50 firmly mounting attachment device 16 on support components 13. Once piston attachment device 16 is inserted through aperture 50, mounting stud 28 of piston 22 is inserted through opening 110 defined by the free ends 101 of tangs 104.

As mounting stud 28 travels through opening 110, camming surface 122 of stud 28 contacts the upper surface of tangs 104 which act as a camming surfaces to flex tangs 104 outwardly until shoulder 124 passes beyond free ends 108 of tangs 104, whereupon the stressed tangs will snap inwardly to assume the position shown in FIG. 11. In this position, radial shoulders 124 will engage the bottom free ends 108 of tangs 104. It is noted, that the free ends of tangs 104 lie in the horizontal plane and thus abut flushly against shoulder 124 to assure a uniform holding power.

The vertical lengths of tangs 104 are equal to the distance from shoulder 124 to annular recess surface 29 such that free ends 108 of tangs 104 abuts above shoulder 124 and the attached ends, abuts annular surface 29. Moreover, the length of fingers 94 and 97 is sized such that when piston attachment device 16 is inserted into aperture 50 and, shoulders 102 engage lower structural component 13, disc-shaped annular base 92 engages bottom surface 136 of component 13. However, the length of tangs 104 and fingers 94 is such so that when assembled, bottom mounting surface or base 33 of piston 22 abuts the upper surface 113 of structural component 13 complementarily. Moreover, upper mounting surface 113 of attachment device 16 abuts complementarily to the bottom surface of structural component 13.

The various lengths discussed above, as seen particularly in FIG. 11, restrain the piston from axial movement. Particularly, when a downward force is applied to piston 22, the abutting relation of piston mounting surface 33 and the upper surface of lower structural component 13 will preclude downward movement. When an upward force is applied to piston 22, shoulder 124 will engage free ends 108 of tangs 104. Such upward force will be transferred to the abutting relation between the annular base and lower mounting surface of lower support 13, thereby precluding the disengagement of the air spring. It is further noted that due to the angle of tangs 104 which form an acute angle with their respective stems, the more force applied by shoulder 124, the stronger the engagement between shoulders 124 and tangs 104 becomes, as the force will cause tangs 104 to further flex inward restraining the movement of the mounting stud 28. In order to prevent the axial movement of the piston with regard to the lower support structure, the axial distance between disc-shaped annular base 92 of attachment device 16 and annular mounting base 33 should be equal to the thickness of lower structural component 13 so that the engagement therewith will be rigid, with no axial play therebetween.

Figure 12:
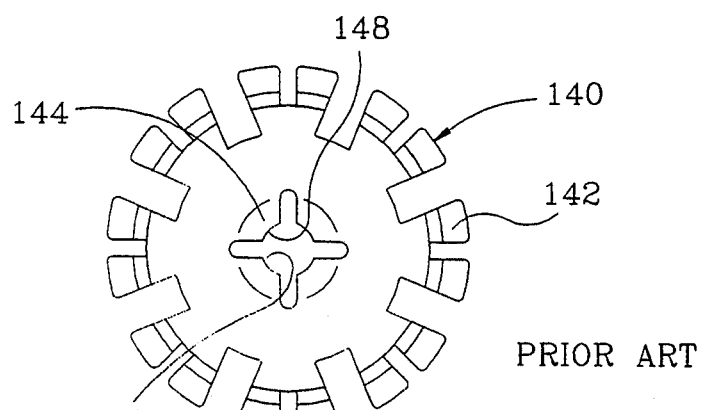
FIG. 12 is a top plan view of a prior art retaining device of which the present invention is an improvement thereon.

Referring to the prior art shown particularly in FIG. 12, it is shown generally as a disc-shaped metal member 140. The prior art disc-shaped member 140 has radially about its circumference, a plurality of tabs 142 which are used either to provide a means to attach the member to the support surface via welding or brazing or they may be set directly in a recess in the top of a mounting structural member. Through the center of member 140 is an aperture 146 around which is placed a plurality of restraining tangs 144. During installation, restraining tangs 144 frictionally engage a mounting stud attached to the plate of the fluid actuated device. As the mounting stud travels through aperture 146 restraining tangs 144, which are bent slightly downward at their free end 148, engage the threads of the mounting stud thereby precluding its axial movement. However, for such a device to provide sufficient strength, restraining tangs 144 must be made of metal. This metal is subject to corrosion, and plating the steel with zinc for example, to prevent corrosion, is an expensive process. Moreover, the prior art does not permit for installation in a blind hole when access to the mounting bracket is limited. Furthermore, restraining tangs 144 are made of a rigid material, and therefore are subject both to fatigue failure, as well as deformation during the initial assembly process. Particularly, if the mounting stud is not axially aligned with the center axis of aperture 146, restraining tangs 144 are subject to be deformed as the mechanic will not be sure, due to the limited access, whether the tangs 144 are properly engaging the mounting stud.

Accordingly, the improved snap mounted attachment device of the present invention is simplified, provides an effective, safe, inexpensive, and efficient device which achieves all the enumerated objectives, provides for eliminating difficulties encountered with prior devices, specifically providing for the ease of installation in blind hole type environments, as well as for installation where no further tools other than the mechanics hand, is necessary, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved snap mounted attachment device is constructed and used, the characteristics of the device, and the advantageous, new and useful results obtained; the new and useful structures, devices, elements, arrangements, parts and combinations, are set forth in the appended claims.

I claim:

1. A one-piece attachment device for mounting a fluid actuated member on a support component, wherein such support component is formed with a mounting aperture, said device including:
   a plurality of circumferentially spaced upstanding flexible first fingers, each having a free outer end with a camming surface and a retaining surface being provided thereon, said retaining surfaces lying in a first imaginary circle;
   a plurality of circumferentially spaced second fingers each having a flexible free outer end, said second fingers being upstanding in the same direction as the first fingers and extending inwardly toward each other, with said free outer ends lying in and defining a second imaginary circle concentric with and located within the first imaginary circle and forming a circular opening therebetween;
   said plurality of first fingers being means for flexing inwardly and passing through an aperture of a support component when inserted therethrough, with said retaining surfaces being means for engaging said support component to secure said attachment device on said support component; and said free outer ends of the plurality of second fingers being means for engaging a mounting component of said fluid actuated member when such a component is inserted through the opening defined by said second fingers, said second fingers being means for securing said fluid actuated member on said support component, after said attachment device has been mounted thereon.

2. The attachment device of claim 1 wherein each of said first fingers has a stem terminating at the free outer end, said end being provided with an outwardly extending shoulder which forms the retaining surface and a tapered surface which forms the camming surface, said first fingers being moved inwardly towards each other by engagement of the camming surfaces with a support component as said first fingers pass through an aperture in a support component thereafter returning toward their original position, with the finger shoulders being adapted to engage a support component to secure said attachment device thereto.

3. An attachment device as defined in claim 1 wherein each of said second fingers has a stem terminating at its free end, said free ends each having an inwardly extending deflectable tang, each tang having an inner tip, which tips define the circular opening through which a mounting component of the fluid actuated member will pass when being mounted on a support component.

4. An attachment device as defined in claim 3 wherein each of the tangs form an acute angle with their respective stems.

5. An attachment device as defined in claim 1 wherein said first and second fingers each have a stem; and in which said stems terminate at and are formed integrally with an annular base.

6. An attachment device as defined in claim 5 in which the annular base as a peripheral flange portion which extends outwardly from the finger stems; and in which the stems of the first fingers extend generally perpendicularly from said base.

7. An attachment device as defined in claim 1 wherein each of the first and second fingers has a stem and an outer surface, said outer surfaces defining a generally slotted cylindrical wall.

8. An attachment device as defined in claim 1 wherein each of the first fingers has a stem with a generally straight flat outer surface, said outer surfaces defining a slotted cylinder; and in which each of the second fingers has a stem, said second finger stems extending inwardly toward each other within said slotted cylinder wherein the outer free ends of said second fingers define said circular opening located concentrically within said slotted cylinder.

9. An attachment device as defined in claim 1 wherein said device is formed of a plastic material.

10. In combination, first and second spaced apart support components, a fluid actuated member having first and second ends, with each end having a mounting stud; and first and second attachment devices for mounting said fluid actuated member on and between said support components; comprising:
 (a) an aperture formed in each of the support components;
 (b) a first plurality of flexible fingers formed on each of the attachment devices being means for snap-fit mounting a respective one of said attachment devices on a respective one of the support components upon insertion of said fingers through the aperture of the support component, each of said first fingers having a stem terminating at a free outer end, said free outer end being provided with an outwardly extending shoulder which forms a retaining surface and a tapered surface which forms a camming surface, said first fingers being moved inwardly towards each other by engagement of the camming surfaces with one of the support components as said first fingers pass through the apertures in the said support component thereafter returning toward their original position, with the finger shoulders being means for engaging said support component to secure said attachment device thereto; and
 c) a second plurality of flexible fingers formed on each of the attachment devices having free ends defining an opening therebetween, being means for snap-fit mounting a respective mounting stud of the fluid actuated member on a respective one of the attachment devices upon insertion of said stud through the openings defined by said second fingers.

11. The combination defined in claim 10 wherein each of the ends of the fluid actuated member has a generally flat base formed with a central recess; and in which the mounting studs are located within said recesses and extend outwardly therefrom.

12. The combination defined in claim 10 in which the aperture of one of the support components is formed by an annular boss extending outwardly from said one support component.

13. The combination defined in claim 10 in which each of said second fingers has a stem terminating at its free end, said free ends each having an inwardly extending deflectable tang, each tang having an inner tip, which tips define the circular opening through which the mounting stud of the fluid actuated member will pass when being mounted on one of the attachment devices.

14. In combination, first and second spaced apart support components, a fluid actuated member having first and second ends, with each end having a mounting stud; and first and second attachment devices for mounting said fluid actuated member on and between said support components; comprising:
 (a) an aperture formed in each of the support components;
 (b) a first plurality of flexible fingers formed on each of the attachment devices being means for snap-fit mounting a respective one of said attachment devices on a respective one of the support components upon insertion of said fingers through the aperture of the support component; and
 c) a second plurality of flexible fingers formed on each of the attachment devices having free ends defining an opening therebetween, being means for snap-fit mounting a respective mounting stud of the fluid actuated member on a respective one of the attachment devices upon insertion of said studs through the openings defined by said second fingers, each of said second fingers having a stem terminating at its free end, said free ends each having an inwardly extending deflectable tang, each tang having an inner tip, which tips define the opening through which the mounting stud of the fluid actuated member will pass when being mounted on one of the attachment devices.

15. The combination defined in claim 14, wherein each of the tangs form an acute angle with their respective stems.

16. A one-piece attachment device for mounting a fluid actuated member on a support component, wherein such support component is formed with a mounting aperture, said device including:
- a plurality of circumferentially spaced upstanding flexible first fingers, each having a free outer end with a camming surface and a retaining surface being provided thereon, said retaining surfaces lying in a first imaginary circle;
- a plurality of circumferentially spaced upstanding second fingers each having a stem terminating at a flexible free outer end, with said free outer ends each having an inwardly extending deflectable tang, each tang having an inner tip, said tips lying in and defining a second imaginary circle concentric with and located within the first imaginary circle and forming a circular opening therebetween;
- said plurality of first fingers being means for flexing inwardly and passing through an aperture of a support component when inserted therethrough, with said retaining surfaces being means for engaging said support component to secure said attachment device on said support component; and
- said free outer ends of the plurality of second fingers being means for engaging a mounting component of said fluid actuated member when such a component is inserted through the opening defined by said second fingers, said second fingers being means for securing said fluid actuated member on said support component, after said attachment device has been mounted thereon.

* * * * *